No. 822,313. PATENTED JUNE 5, 1906.
S. STEVENS.
FASTENING DEVICE.
APPLICATION FILED DEC. 28, 1905.
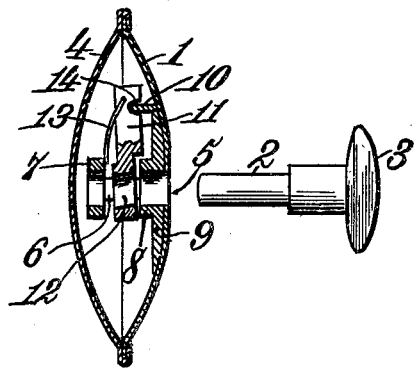
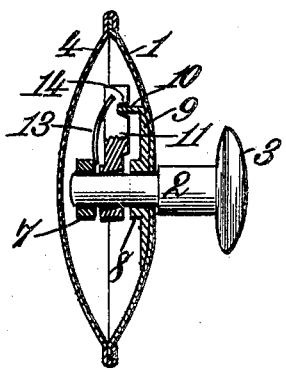
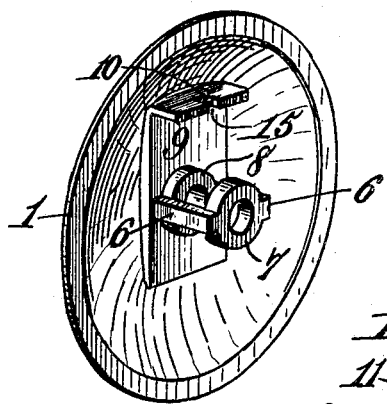
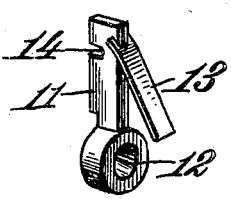
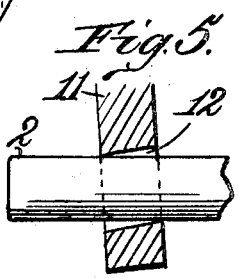
Witnesses.
Inventor.
Seriah Stevens.

UNITED STATES PATENT OFFICE.

SERIAH STEVENS, OF BOSTON, MASSACHUSETTS.

FASTENING DEVICE.

No. 822,313.  Specification of Letters Patent.  Patented June 5, 1906.

Application filed December 28, 1905. Serial No. 293,602.

*To all whom it may concern:*

Be it known that I, SERIAH STEVENS, a citizen of the United States, residing at Boston, in the county of Suffolk and State of Massachusetts, have invented new and useful Improvements in Fastening Devices, of which the following is a specification.

My invention relates to improvements in fastening devices, more particularly, though not exclusively, intended as a separable-member garment-button, but applicable to other uses—for example, as a carriage-curtain button or fastener, a door-button, and other more or less analogous contrivances.

The invention has for its object to provide a fastening device wherein the shank member may be inserted into the socket member with ease and facility by a simple forward rectilinear movement and be automatically locked therein in a novel manner and by novel means, against withdrawal by direct pull on the shank.

To the end stated, the invention consists in a fastening device—such, for example, as a button—possessing the features and arrangement hereinafter described, and illustrated in the accompanying drawings.

That which is regarded as new will be described in the appended clauses of claim.

In the accompanying drawings, illustrating, as the statute requires, the best-known type of my invention—as, for example, in a garment-button—Figure 1 is a view showing the socket member in section and the shank member in side view detached therefrom; Fig. 2, a similar view of said members assembled. Fig. 3 is a perspective view of a socket member with the cover removed; Fig. 4, a perspective view of the shank-locking element. Fig. 5 is an enlarged detail illustrating the binding locking engagement of the locking-arm upon the shank.

In said drawings the reference-numeral 1 designates one of the separable members of a fastening device, which for brevity and comprehensiveness will be herein designated the "socket" member as definitive thereof, whether regarded as a head or socket member of a button or curtain fastening or analogous device, irrespective of its particular environment, and 2 the shank member thereof, having a head 3. When the invention is embodied as a garment-button, as illustrated, the head or socket member is preferably provided with a cover 4, suitably secured thereto, as by a spun connection. The head or socket member is provided with a perforation 5, conforming to the cross-sectional shape of the shank and with permanently-attached posts 6, provided with separated shank receiving and restraining parts 7 and 8, that engage the shank at separate and distant points in its length, preferably at its extremity and at an intermediate point, and thus serve to prevent wabbling or any deviation from perpendicular to the area of the opening 5 in the socket member 1. The restraining parts in the illustrated example of the invention consist of rings the openings or perforations of which receive the shank, which openings are in alinement with or concentric to the opening 5, whereby a straight passage for the shank is provided. As shown, the posts are connected to a plate 9, rigidly attached to the head or socket member 1 and provided with a knife-edge bearing 10. Pivoted on said bearing is a pendulous oscillatory shank-locking arm 11, the free end of which is disposed in the space between the shank-restraining parts and projects into the passage or path of movement of the shank. This shank-locking arm is provided with an eye 12 to encircle the shank 2. Combined with said arm is a spring 13, preferably arranged, as shown in the drawings, with its free end bearing against the ring 7 and operating normally to move the free end of the arm 11 to and maintain it in the position shown in Fig. 1, in which position, it will be observed, the eye 12 thereof is not concentric with the openings in the restraining parts 7 8. In other words, it is not in perfect alinement or register with the said openings, but, on the contrary, (see Fig. 1,) the wall of the eye projects at diagonally opposite points into the shank-passage.

With the parts thus arranged the shank may be readily inserted into the socket member 1 through the opening 5 therein and into the control of the restraining parts 7 8 by a direct forward or rectilinear movement, engaging in its passage the wall of the eye of the locking member and oscillating said member and passing into the opening in the restraining part 8. As soon as the shank has been adjusted into the position shown in Fig. 2 the locking member assumes the position shown in said Fig. 2 in binding engagement with the shank at diagonally opposite points of the shank and in different planes, exerting, as it were and as most clearly shown in Fig.

5, a binding grip upon the shank, whereby said shank is locked against withdrawal in a directly forward or rectilinear path. Attempt to so withdraw the shank results in increasing the binding action of the locking member upon the shank and resists such character of withdrawal. The shank may, however, be easily withdrawn by rotation thereof, accompanied by a slight forward pull.

Displacement or movement of the locking member other than the operative oscillatory movement hereinbefore described is prevented by an interlock consisting of a recess 14, which fits said knife-edge bearing, and a recess or seat 15 in said bearing, into which the locking members fit.

By my invention I provide a novel fastening device which is simple and economical of construction, possesses a new and simple mode of operation, and is efficient in practice.

Having thus described my invention, what I claim is—

1. In a fastening device, a socket member, shank-restraining parts combined therewith, and a pendulous locking-arm the free end of which is disposed between said restraining parts and provided with diagonally opposite shank-engaging portions.

2. In a fastening device, a socket member, shank-restraining parts combined therewith, and a spring-pressed pendulous locking-arm, the free end of which is disposed between said restraining parts and provided with diagonally opposite shank-engaging portions.

3. In a fastening device, a socket member provided with a shank-opening, shank-restraining parts associated with the socket member to engage the shank in different planes and a pendulous locking member provided at its free end with an eye for passage of a shank, the wall of which eye projects into the path of the shank to exert a binding action upon said shank.

4. In a fastening device of the character described, the combination of a socket member provided with shank receiving and restraining parts, a pendulous arm the free end of which is disposed between said shank receiving and restraining parts and provided with an eye, the wall of which normally projects into the path of the shank, and a shank member adapted to be introduced into the socket member, swing the pendulous arm, pass through the eye thereof, and enter the shank receiving and restraining parts, whereby the pendulous arm exerts a binding action on the shank automatically resisting withdrawal of the shank by a direct pull forward.

In testimony whereof I have hereunto set my hand in presence of two subscribing witnesses.

SERIAH STEVENS.

Witnesses:
   GEO. W. P. BABB,
   ARTHUR N. FOLSOM.